US006739627B2

(12) United States Patent
Cobben et al.

(10) Patent No.: US 6,739,627 B2
(45) Date of Patent: *May 25, 2004

(54) SECURITY FEATURE COMPRISING A PERFORATION PATTERN

(75) Inventors: Johannes I. M. Cobben, Veldhoven (NL); Abraham Elenbaas, Sprundel (NL)

(73) Assignee: Industrial Automation Integrators (I.A.I.) B.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,585
(22) PCT Filed: Nov. 4, 1997
(86) PCT No.: PCT/NL97/00604
§ 371 (c)(1),
(2), (4) Date: Jul. 20, 1999
(87) PCT Pub. No.: WO98/19869
PCT Pub. Date: May 14, 1998

(65) Prior Publication Data
US 2002/0027359 A1 Mar. 7, 2002

(30) Foreign Application Priority Data
Nov. 5, 1996 (NL) .............................................. 1004433

(51) Int. Cl.⁷ ................................................ B42D 15/00
(52) U.S. Cl. .......................... 283/91; 156/277; 283/67; 283/113; 283/902; 428/195
(58) Field of Search ............................. 283/67, 91, 92, 283/902, 89, 113; 156/277; 162/134, 140, 187; 428/916, 195

(56) References Cited

U.S. PATENT DOCUMENTS 4,061,436 A * 12/1977 Durrer ........................... 408/3
4,253,086 A * 2/1981 Szwarcbier .................. 356/71
4,269,473 A * 5/1981 Flothmann et al. ............ 283/9

(List continued on next page.)

FOREIGN PATENT DOCUMENTS

| DE | 9315294 | 2/1994 |
| EP | 0523304 | 1/1993 |
| FR | 2740727 A1 * | 5/1997 |
| WO | 95/26274 | 10/1995 |
| WO | 97/18092 | 5/1997 |
| WO | 97/25213 * | 7/1997 |

*Primary Examiner*—Monica S. Carter
(74) *Attorney, Agent, or Firm*—Banner & Witcoff, Ltd.

(57) ABSTRACT

A document to be protected against forgery. The document includes a security feature in the form of a perforation pattern, wherein the perforation pattern extends over a surface of the document and represents an image comprising brightness tones. The perforation pattern is herein formed such that, for instance when the thus treated document is held up to the light or placed on a light box, an image becomes visible at the location of the perforation pattern. It will be apparent that arrangement of such an image representing brightness tones requires extremely advanced technologies. Such technologies are not easily accessible to potential forgers. Hence, documents provided with such a perforation pattern are very difficult to forge. The perforation pattern is preferably applied by a laser.

12 Claims, 3 Drawing Sheets

U.S. PATENT DOCUMENTS

| | | | |
|---|---|---|---|
| 4,599,509 A | * | 7/1986 | Silverman et al. ........... 235/382 |
| 4,673,609 A | * | 6/1987 | Hill ............................. 428/187 |
| 4,785,290 A | * | 11/1988 | Goldman .................... 235/380 |
| 4,972,476 A | * | 11/1990 | Nathans ....................... 380/23 |
| 5,145,212 A | * | 9/1992 | Mallik ......................... 283/86 |
| 5,160,171 A | * | 11/1992 | Gregory et al. ............... 283/91 |
| 5,211,424 A | * | 5/1993 | Bliss ......................... 283/904 |
| 5,291,243 A | * | 3/1994 | Heckman et al. ........... 355/201 |
| 5,337,361 A | * | 8/1994 | Wang et al. ................... 380/51 |
| 5,447,335 A | * | 9/1995 | Haslop ........................ 283/86 |
| 5,449,200 A | * | 9/1995 | Andric et al. ................. 283/67 |
| 5,484,997 A | * | 1/1996 | Haynes ....................... 235/487 |
| 5,550,346 A | * | 8/1996 | Andriash et al. ........... 219/121 |
| 5,666,191 A | * | 9/1997 | Hasegawa et al. .......... 283/902 |
| 5,694,229 A | * | 12/1997 | Drinkwater et al. .......... 283/94 |
| 5,753,352 A | * | 5/1998 | Vanmaele et al. .......... 283/902 |
| 5,754,675 A | * | 5/1998 | Valadier .................... 382/115 |
| 5,760,386 A | * | 6/1998 | Ward .......................... 235/493 |
| 5,787,186 A | * | 7/1998 | Schroeder .................... 283/70 |
| 5,801,857 A | * | 9/1998 | Heckenkamp et al. ........ 283/92 |
| 5,808,758 A | * | 9/1998 | Solmsdorf ................... 283/91 |
| 5,841,886 A | * | 11/1998 | Rhoads ....................... 382/232 |
| 5,863,074 A | * | 1/1999 | Wilkinson ................... 283/67 |
| 5,876,068 A | * | 3/1999 | Schneider et al. ............ 283/86 |
| 5,900,954 A | * | 5/1999 | Katz et al. .................... 283/86 |
| 5,968,788 A | * | 10/1999 | Miyata et al. .............. 428/195 |
| 6,019,395 A | * | 2/2000 | Souparis ...................... 283/86 |
| 6,024,287 A | * | 2/2000 | Takai et al. ................. 235/494 |
| 6,141,438 A | * | 10/2000 | Blanchester ................ 382/140 |
| 6,212,805 B1 | * | 4/2001 | Hill ............................ 40/443 |
| 6,222,650 B1 | * | 4/2001 | Long ............................ 359/2 |
| 6,302,444 B1 | * | 10/2001 | Cobben ....................... 283/72 |
| 6,325,585 B1 | * | 12/2001 | Sasaki et al. ................. 412/11 |
| 6,328,342 B1 | * | 12/2001 | Belousov et al. ............. 283/91 |

\* cited by examiner

SECURITY FEATURE COMPRISING A PERFORATION PATTERN

BACKGROUND OF THE INVENTION

The present invention relates to a document to be protected against forgery, comprising a security feature in the form of a perforation pattern.

Such a document is known from the international patent application PCT/NL95/00119.

In this prior art document the perforation pattern takes the form of a character or a number of characters. This perforation pattern is herein applied in the form of round, rectangular, or character-like perforations. These perforation patterns are therefore always representations of a black and white image without intensity differentiation.

SUMMARY OF THE INVENTION

Although making these perforations already raises a considerable barrier for potential forgers, there exists a need for a security feature which is even more difficult to forge.

This object is achieved in that the perforation pattern extends over a surface of the document and represents an image comprising brightness tones.

The perforation pattern is herein formed such that, for instance when the thus treated document is held up to the light or placed on a light box, an image becomes visible at the location of the perforation pattern.

It will be apparent that arrangement of such an image representing brightness tones requires extremely advanced technologies. Such technologies are not easily accessible to potential forgers, so that documents thus provided with such a perforation pattern are very difficult to forge.

The perforation pattern is preferably applied by means of laser light.

This measure has the advantage that at the position of the perforation the material, for instance paper, plastic or textile is completely removed, so that when for instance the fingertips brush over the document no elevation or channel or burr can be felt at all.

If for instance a perforation pattern were to be applied by forgers by means of for instance conically formed needles, cup-shaped edges or burrs are always created which are easily discernible with the fingertips. This therefore provides a good means of identifying possible forgeries.

According to yet another preferred embodiment, the perforation pattern is a representation of an image arranged on the document by means of a different technique.

Owing to the possibility of visually comparing the image and the perforation, thus without the deployment of complicated assist means being required, a less than perfect forgery of just one of the two becomes immediately recognizable. A high degree of security against fraud is thus obtained.

This measure requires that, in order to make such a document, there must be present means for making the perforation pattern and means for making the associated image with a different technique, respectively means for recording this image and putting it into digital form to enable control of the means necessary for making a perforation pattern.

According to yet another preferred embodiment, the image arranged by means of a different technique is specific to the document. This provides the option of personalizing the document. It will be apparent that this results in an even higher level of security.

An important application of the present invention lies in the fact that the document is a passport and that the image is a passport photograph.

Other preferred embodiments are stated in the remaining sub-claims. It is pointed out here that the invention also relates to a method for applying a security feature in the form of a perforation pattern in a document, wherein the perforation pattern is applied by a laser device which is adapted to successively apply a perforation pattern in the document, wherein the size of the perforation holes or the density of the perforation holes is controlled by means of an electronic representation of the image.

The present invention also relates to a device for performing such a method.

BRIEF DESCRIPTION OF THE FIGURES

The present invention will be elucidated hereinbelow with reference to the annexed figures, in which.

DETAILED DESCRIPTION OF THE FIGURES

Before discussion of the technique, it is pointed out that in the present technique the making of brightness tones, as in the graphic art, is possible by means of perforations which are applied according to a fixed grid, wherein the size of the perforations is a measure for the intensity and that it is also possible to reproduce brightness tones by making use of perforation holes of equal dimensions, wherein the density of these dimensions is a measure for the intensity. Both options can in principle also be combined.

It is pointed out here that in the graphic art the first option is equivalent to the manner in which black and white photographs are reproduced in newspapers and that an example of the second technique can be found in the series of Netherlands postage stamps in which the likeness of Her Majesty the Queen is represented by dots of varying density.

Figure 1:
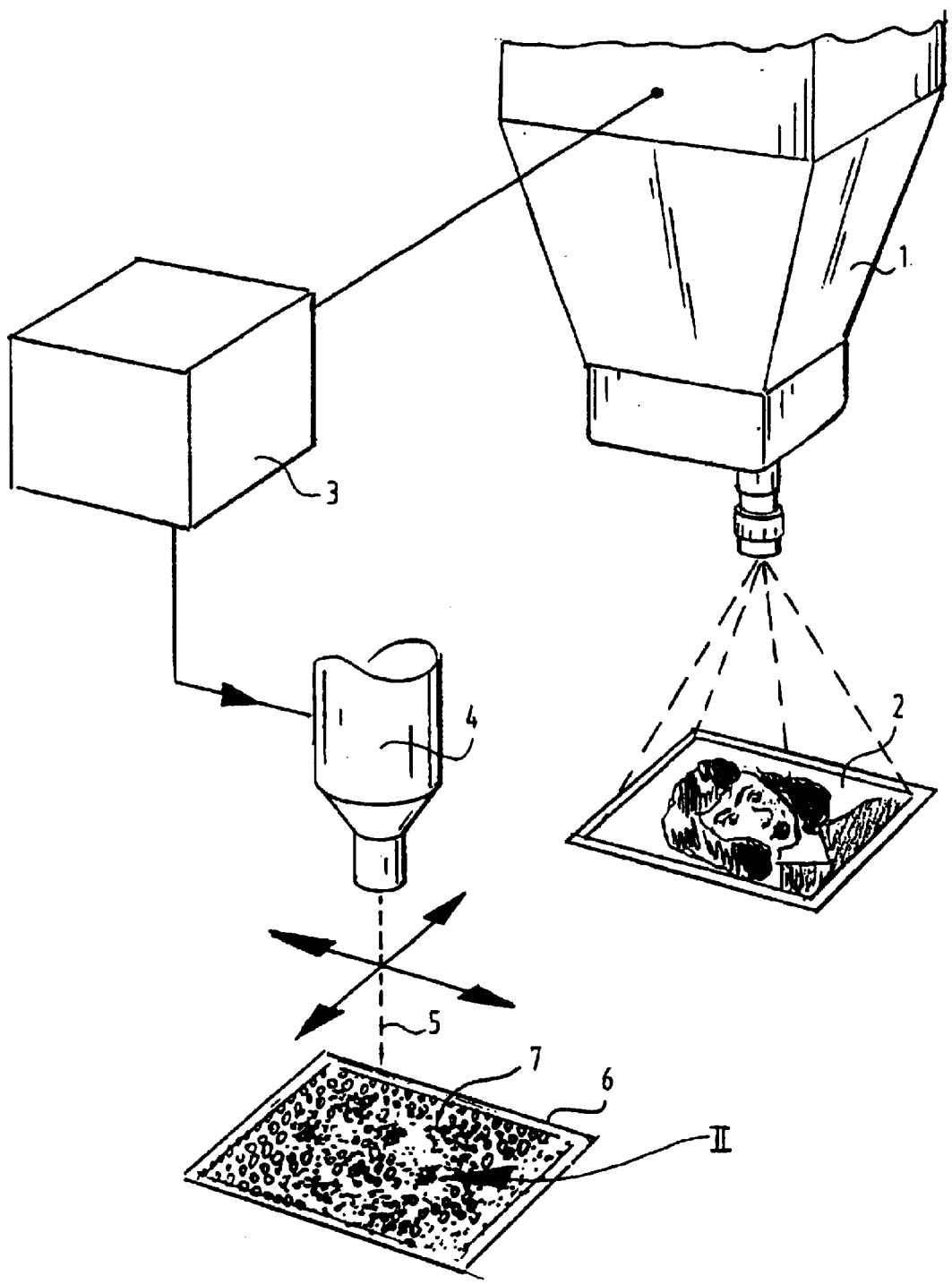
FIG. 1 shows a schematic perspective view of a device for manufacturing a document according to the present invention.

Shown in FIG. 1 is a video camera 1 which is directed at a passport photograph 2. Video camera 1 records the image of passport photograph 2, converts it into an electronic form and feeds the thus obtained signal to a computer 3 in which it is stored.

The device shown in FIG. 1 further comprises a laser beam generating means 4 which is controlled by computer 3. This control relates not only to the intensity and focussing of the laser beam 5 transmitted by laser device 4, but also to the direction in which laser beam 5 is transmitted. It is possible to vary this direction in two planes to apply a perforation pattern 7 in a document 6.

It is pointed out here that such laser devices are known in the prior art; in order to change the laser light beam use is herein made of mirror systems not otherwise shown in FIG. 1.

It is also possible to have laser device 4 stand still and to cause a carrier on which document 6 is placed to move. It is also possible to cause the carrier to move in one direction and the laser beam in the other direction; the choice between the various possibilities depends on the technology used.

Essential is however that perforation pattern 7 comprises perforation holes of differing diameter, wherein the diameter is a function of the brightness to be represented in the image. Perforation holes of differing density can be made by causing the laser beam to generate more or fewer holes locally.

Figure 2:
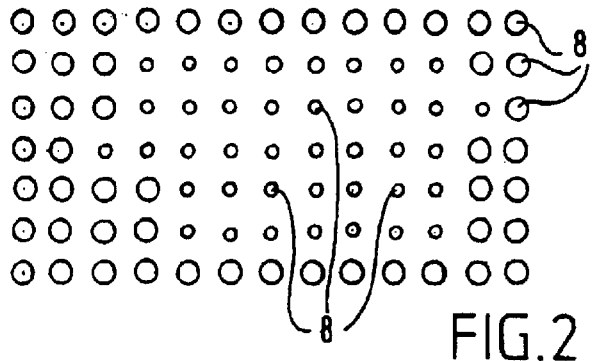
FIG. 2 shows a detail view of a perforation pattern such as illustrated in FIG. 1.

This is illustrated more clearly in FIG. 2, which shows a detail of perforation pattern 7. Herein can be seen that in the present embodiment the perforation pattern is formed by perforation holes 8 which are ordered in a regular grid, for instance a rectangular grid. The dimension of the holes is herein a measure for the brightness of the image represented by, perforation pattern 7, in the present case the passport photograph 2. It is noted here that the dimensions of the perforation holes can be adjusted continuously, thus in principle in analog manner; by processing with a digital computer a finite, yet large number of stages is however obtained. Tests have demonstrated that it is nevertheless possible to obtain a representation of an image which forms an adequate rendering of the relevant image and can be easily compared therewith.

It will be apparent that in this manner a good authenticity feature is obtained which is difficult to copy.

Figure 3:
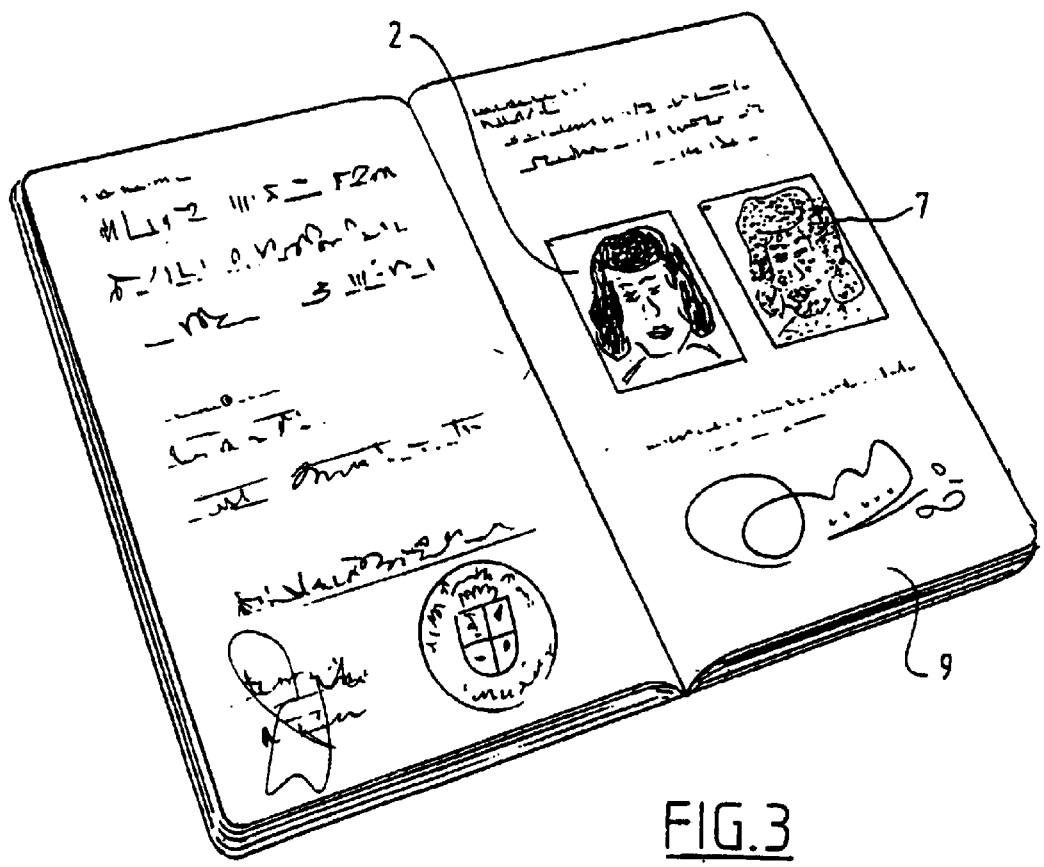
FIG. 3 is a schematic perspective view of a passport according to the present invention.

Shown in FIG. 3 is a passport 9 in which the photograph 2 is fixed, for instance by means of glue, tubular rivets or other manner of attachment. On the same page, adjacently thereof, a perforation pattern 7 representing the relevant image is applied. A good comparison can be made by holding up the relevant page of the passport to the light.

It is otherwise also possible to apply the perforation pattern on another page of the passport, provided a quick visual comparison is possible. This makes forgery more difficult since at least two different pages must be forged for this purpose. It is also possible to apply the image enlarged, reduced in size or modified in other manner.

Figure 4:
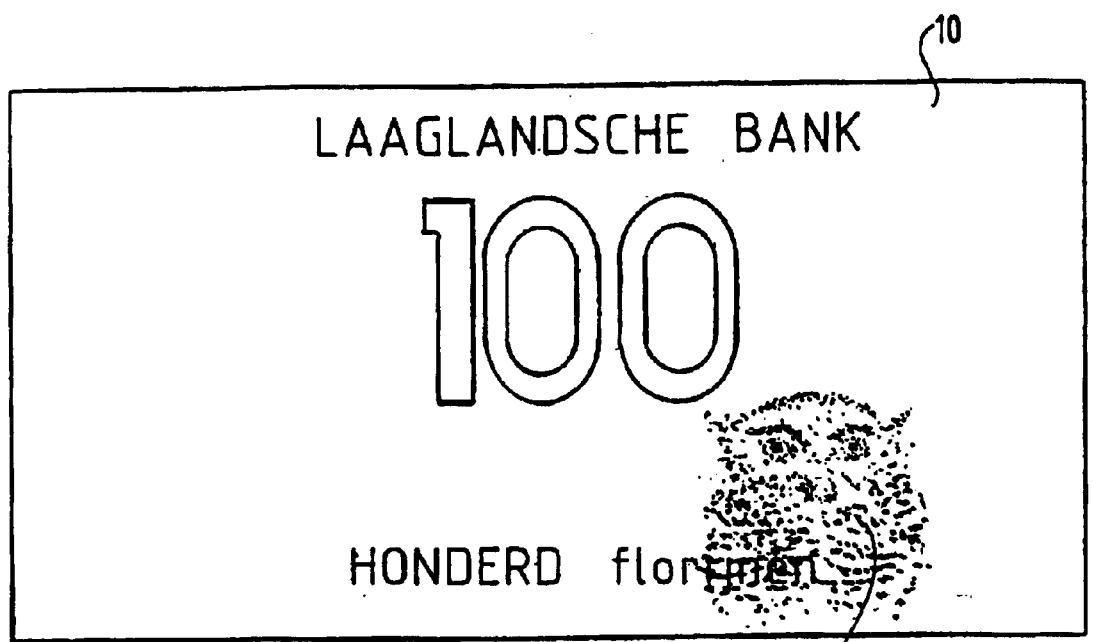
FIG. 4 shows a view of a bank note provided with a pattern according to the present invention.

FIG. 4 shows a banknote 10 which is provided with a perforation pattern 11, in the present case in the form of an owl. This perforation pattern is not related to another image arranged on the banknote but forms exclusively a security feature per se; it is possible to provide banknotes with such a security feature. It is again pointed out that the difference with the prior art lies in the fact that the image 11 represents different brightness tones, for instance grey tones. Use is otherwise made herein of a free grid, wherein the dimensions of the perforations are the same and the density of the perforations varies in order to represent the grey tones.

Figure 5:
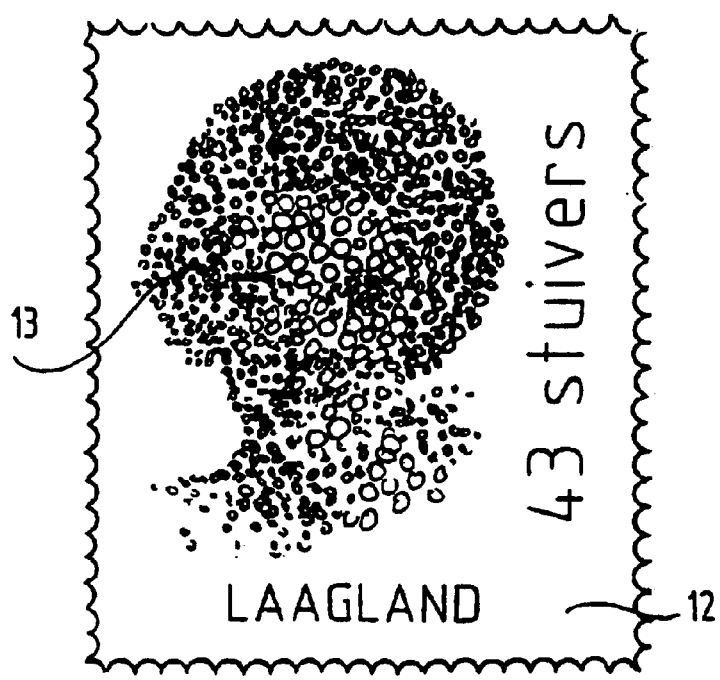
FIG. 5 shows a postage stamp provided with a perforation pattern according to another embodiment of the present invention.

The same applies for the postage stamp 12 shown in FIG. 5 which is provided with a perforation pattern 13 in the form of a likeness of Her Majesty the Queen; both forms are herein combined, i.e a varying grid, wherein the dimensions of the perforations also differ.

What is claimed is:

1. A document to be protected against forgery, said document comprising:
   at least one outwardly visible surface capable of carrying indicia and a security feature providing a representation of a passport photograph including a perforation pattern having spaced perforation holes of different diameters extending over and through said outwardly visible surface of the document, said spaced perforation holes providing different brightness tones within the representation, said brightness tones corresponding to and depicting respective different brightness aspects of the passport picture being represented, each said perforation hole being formed by a laser light so that it includes a smooth outer edge, wherein said perforation holes in said outwardly visible surface are visible when said outwardly visible surface is viewed in reflected light.

2. The document as claimed in claim 1, wherein the representation is visible when the document is illuminated from the rear.

3. The document as claimed in claim 1 wherein the passport photograph is arranged on the document by a non-laser technique.

4. The document as claimed in claim 1, wherein the security feature is applied on a page of the passport other than the page on which the passport photograph is arranged.

5. The document as claimed in claim 1, wherein the brightness tones of the depiction are realized by varying the size of the perforation holes.

6. The document as claimed in claim 1, wherein the brightness tones are realized by varying the density of the perforation holes.

7. The document as claimed in claim 5, wherein light tones are realized by providing perforation holes having a large diameter or forming a high density of perforation holes in a predetermined area of the document; and wherein dark tones are represented by perforation holes having a small diameter or a low density of perforation holes in said predetermined area.

8. The document as claimed in claim 6, wherein light tones are realized by providing perforation holes having a large diameter or forming a high density of perforation holes in a predetermined area of the document; and wherein dark tones are represented by perforation holes having a small diameter or a low density of perforation holes in said predetermined area.

9. A method for applying a security feature in a passport, said security feature comprising a perforation pattern that represents a passport photograph in the passport, said method comprising the steps of applying a laser device to said passport; successively forming a perforation pattern in the passport through an outwardly visible surface of a portion of the passport, said perforation pattern having a plurality of perforation holes; and controlling the size of the perforation holes or the density of the perforation holes using an electronic representation of the passport photograph to provide the perforation pattern with brightness tones that correspond to and depict respective different brightness aspects of the passport photograph.

10. The method as claimed in claim 9, further comprising the steps of putting the passport photograph into digital form using an optical electronic device, and wherein the perforation pattern is applied on the basis of the digital reproduction of the passport photograph.

11. The method as claimed in claim 10, comprising the step of arranging the photograph in printed form in the passport.

12. A passport to be protected against forgery, said passport comprising:
   at least one outwardly visible surface capable of carrying indicia; and
   a security feature including a perforation pattern that is a representation of a passport photograph applied on the passport by a non-laser technique, said perforation pattern having spaced perforation boles of different diameters extending over and through said outwardly visible surface of a portion of the passport, the spacing of said perforation holes providing said representation of said passport photograph with different brightness tones over said portion of said passport, said brightness tones corresponding to and depicting respective different brightness aspects of the passport picture being represented, each said perforation hole being formed by a laser light so that it includes a smooth outer edge, wherein said perforation holes in said outwardly visible surface are visible when said outwardly visible surface is viewed in reflected light.

* * * * *